United States Patent [19]

Jeschke

[11] Patent Number: 5,218,994
[45] Date of Patent: Jun. 15, 1993

[54] ARRANGEMENT HAVING A PNEUMATIC CONTROL VALVE WITH A HOUSING CLOSED ON ALL SIDES

[75] Inventor: Norbert Jeschke, Dietzenbach-Hexenberg, Fed. Rep. of Germany

[73] Assignee: Samson Aktiengesellschaft, Fed. Rep. of Germany

[21] Appl. No.: 907,285

[22] Filed: Jul. 1, 1992

[30] Foreign Application Priority Data

Jul. 5, 1991 [DE] Fed. Rep. of Germany ....... 4122726

[51] Int. Cl.⁵ .................................................. F16K 37/00
[52] U.S. Cl. ................................. 137/554; 137/556.3
[58] Field of Search ........................... 137/556.3, 554

[56] References Cited

U.S. PATENT DOCUMENTS

| | | | |
|---|---|---|---|
| 3,332,438 | 7/1967 | Abdullaev et al. | 137/554 |
| 3,390,943 | 7/1968 | Myers | 137/554 |
| 4,156,437 | 8/1979 | Chivens et al. | 137/554 |
| 4,198,030 | 4/1980 | Jackson et al. | 137/554 |
| 4,518,008 | 5/1985 | Fenster et al. | 137/554 |
| 4,618,824 | 10/1986 | Magee et al. | 137/554 |
| 4,922,952 | 5/1990 | Kemmler | 137/382 |
| 4,925,498 | 5/1990 | Kemmler | 137/382 |

FOREIGN PATENT DOCUMENTS 3116640 12/1983 Fed. Rep. of Germany .

Primary Examiner—A. Michael Chambers
Attorney, Agent, or Firm—Hill, Steadman & Simpson

[57] ABSTRACT

An arrangement having a pneumatic control valve having a pneumatic motor operator, a position controller having a pneumatic output and replaceable without deteriorating the function of the motor operator, a translationally moveable valve stem between motor operator and valve, a transmission means for imaging the position of the valve stem onto a movable transmission rod of the position controller, and a yoke that rigidly joins the motor operator and the valve housing, wherein the transmission rod of the position controller and the transmission means are spatially disposed in a space of a housing closed on all sides and wherein the transmission rod of the position controller is translationally movable.

9 Claims, 1 Drawing Sheet

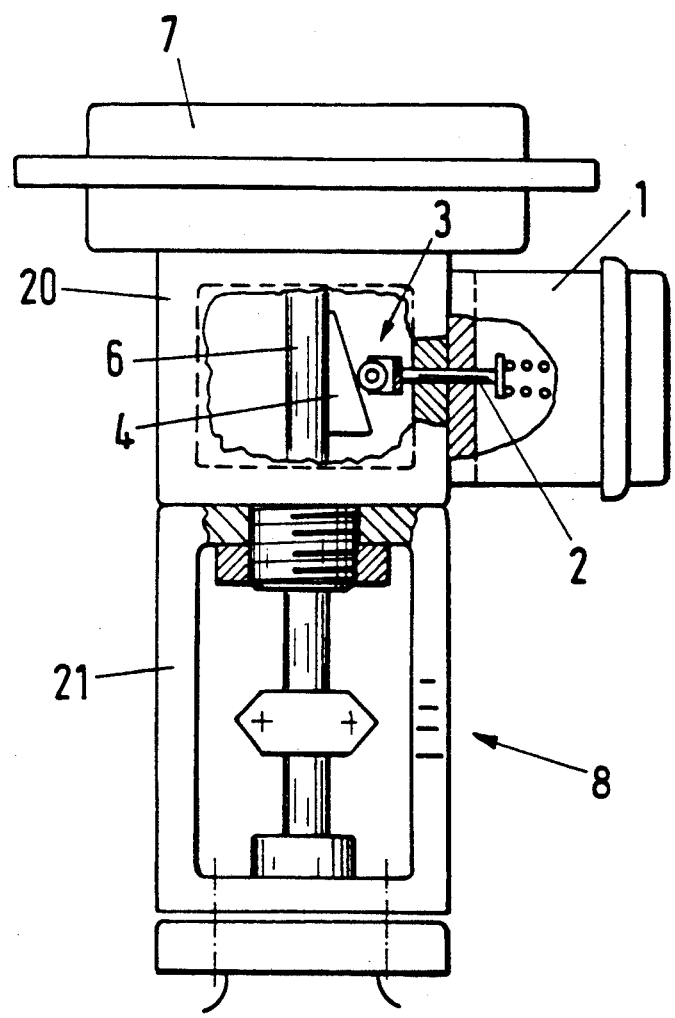

ARRANGEMENT HAVING A PNEUMATIC CONTROL VALVE WITH A HOUSING CLOSED ON ALL SIDES

BACKGROUND OF THE INVENTION

1. Field of the Invention

The present invention is related to a pneumatic control valve, and in particular to such an apparatus having a pneumatic motor operator, a translationally movable valve stem between motor operator and valve, and a position controller having an output means which can be interchanged without deteriorating the function of the motor operator.

2. Description of the Prior Art

German Patent 37 27 008 discloses a pneumatic control valve apparatus having a pneumatic motor operator, a translationally movable valve stem between the motor operator and a valve, a position controller having an output means which can be interchanged without deteriorating the function of the motor, a transmission means for transmitting the position of the valve stem onto a movable transmission rod of the position controller, and a yoke that rigidly connects the motor operator and a valve housing to one another. The transmission rod of the position controller and the transmission means are arranged in a space of the housing closed on all sides.

German Patent 37 27 008 is an improvement on the basic arrangement disclosed by German Published Application 31 16 640. In German Patent 32 27 008, the parts of the arrangement that image and transmit the valve position onto the position controller are protected against access from the outside and thus against influencing and/or damage without losing their easy replaceability.

The arrangements disclosed in German Published Application 37 27 008 and German Patent 31 16 640 provide position controllers having a rotational action. Consequently, the transmission rod of the position controller in these arrangements is a rotational lever. Consequently, the transmission means acts as an articulation means that transmits the translational movement of the valve stem onto the rotational lever as a rotary motion.

However, in an arrangement in which position controllers having a translational input are employed, there is a need to protect the parts that image and transmit the valve position onto the position controller against access from the outside, and thus against influencing and/or damage without losing their easy replaceability.

SUMMARY OF THE INVENTION

It is an object of the present invention to provide a pneumatic control valve apparatus in which the transmission rod of the position controller is translationally moveable inside an enclosure means, thus protecting against access from the outside.

In one embodiment, the transmission means may include a transmission mechanism which may include a cam attached to the valve stem along with a sensor element attached to the transmission rod. The embodiment of the invention shown in the sole drawing provides that the sensing element on the transmission rod is a cam-follower roller. Alternatively, the transmission means may be electro-mechanical. In another variation, the transmission means may be electrically non-contacting. Another embodiment includes a transmission means that operates in an optically non-contacting manner.

The parts that image and transmit the valve stem position onto the position controller in arrangements wherein position controllers having a translational input are employed could hitherto not be protected overall against access from the outside and, thus, against influencing and/or damage. A further development of the basic idea of German Patent 37 27 008 directed to arrangements having position controllers with rotary input assures reliable protection of the parts transmitting the motion of the valve stem onto the position controller and of the operators who would otherwise come into contact with these parts and with position controllers having translational input in which the transmission rod is a connecting rod.

The control valve disclosed herein has the aforementioned advantages obtained by the structure disclosed in German Patent 37 27 008, but in contrast to that structure, uses a translationally moveable transmission rod. Alternatively, the transmission means may operate pneumatically. Another variation includes a transmission means that operates in a magnetically non-contacting manner. In all embodiments of the invention, the direction of motion of the transmission rod may lie non-parallel to the moving direction of the valve stem. Alternatively, the moving direction of the transmission rod may lie essentially perpendicular to the moving direction of the valve stem.

BRIEF DESCRIPTION OF THE DRAWINGS

Exemplary embodiments of the invention are set forth in detail below with reference to the schematic drawing. The sole FIGURE shows an exemplary embodiment of an arrangement of the invention in section and a plane that encloses the longitudinal middle axis of the motor operator as well as of the pneumatic position controller employed in the illustrated exemplary embodiment.

DESCRIPTION OF THE PREFERRED EMBODIMENTS

The exemplary embodiment of the invention shown in the drawing includes a pneumatic position controller 1 having translational input that is embodied by a translationally movable transmission rod 2. The transmission rod 2 includes a cam follower roller 3 that is responsive to the cam surface of a cam 4. Cam 4 is detachably and displaceably secured to a valve stem 6 of a pneumatic control valve referenced 8 overall. The position of the valve stem 6 is transmitted into the inside of the position controller 1 by the interaction of the component parts 2, 3, and 4.

The valve stem 6 of the valve body (not shown here) of the control valve 8 is connected to a pneumatic motor operator 7, which is a diaphragm motor. The motor operator 7 is rigidly connected to a compact yoke 21 of the controller valve via a housing 20 which may have lateral wall recesses. The housing 20 essentially completely encloses the transmission means, including the component parts 3 and 4. The component parts 3 and 4 are thus protected against access from the outside and thus against influencing and/or damage. Though completely enclosed, the component parts can be easily replaced, particularly when the housing 20 is fashioned bipartite in the way already described as preferred in German Paten 37 27 008.

The inventive concept disclosed herein is not limited to a mechanical transmission means as shown here by the cam 4 and the cam follower roller 3 interacting with the translationally movable valve stem 6 and the transmission rod 2 which is translationally movable perpendicular to the valve stem 6 in the illustrated exemplary embodiment. Alternatively, the transmission means may operate electrically. In all embodiments, the valve stem 6 and the transmission rod 2 are movable relative to one another in a non-parallel direction.

Both individually, as well as in arbitrary combinations, the features of the invention disclosed in the above description in the drawing as well as in the claims can be critical for realizing the various embodiments of the invention.

Although modifications and changes may be suggested by those skilled in the art, it is the intention of the inventors to embody within the patent warranted hereon all changes and modifications as reasonably and properly come within the scope of their contribution to the art.

We claim as our invention:

1. In an arrangement having a pneumatic control valve having a pneumatic motor operator, a position controller that has a pneumatic output and is replaceable without deteriorating the function of the motor operator, a translationally movable valve stem between motor operator and valve, a transmission means for imaging the position of the valve stem onto a movable transmission rod of the positon controller, and a yoke that rigidly joins the motor operator and the valve housing, said transmission rod and transmission means being arranged in a space of a housing closed at all sides, the improvement comprising said transmission rod being spatially disposed within the position controller for translational movement, and said transmission rod and said valve stem are oriented so that a moving direction of said transmission rod is essentially perpendicular to a moving direction of the valve stem.

2. The improvement of claim 1, wherein said transmission means is an electro-mechanical transmission means.

3. The improvement of claim 1, wherein said transmission means is an electrically non-contacting transmission means.

4. The improvement of claim 1, wherein said transmission means is an optically non-contacting transmission means.

5. The improvement of claim 1, wherein said transmission means is a pneumatic transmission means.

6. The improvement of claim 1, wherein said transmission means is a magnetically non-contacting transmission means.

7. The improvement of claim 1, wherein the transmission means is a mechanical transmission means.

8. The improvement of claim 7, wherein said mechanical transmission means comprises a cam means for imaging the position of the valve stem and a sensing means for transmitting the position of said valve stem.

9. The improvement of claim 8, wherein said sensing means comprises a cam follower roller means for sensing the position of the valve stem.

* * * * *